United States Patent
Smuk

(10) Patent No.: US 10,611,273 B2
(45) Date of Patent: Apr. 7, 2020

(54) RECLINER SYSTEM FOR A VEHICLE SEAT

(71) Applicant: Faurecia Automotive Seating, LLC, Auburn Hills, MI (US)

(72) Inventor: Wojciech Smuk, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/154,254

(22) Filed: Oct. 8, 2018

(65) Prior Publication Data
US 2019/0106025 A1 Apr. 11, 2019

Related U.S. Application Data

(60) Provisional application No. 62/569,822, filed on Oct. 9, 2017.

(51) Int. Cl.
| | |
|---|---|
| *B60N 2/20* | (2006.01) |
| *B60N 2/22* | (2006.01) |
| *B60N 2/235* | (2006.01) |
| *B60N 2/02* | (2006.01) |

(52) U.S. Cl.
CPC ......... *B60N 2/2358* (2013.01); *B60N 2/0232* (2013.01); *B60N 2002/0236* (2013.01)

(58) Field of Classification Search
CPC .......................... B60N 2/2358; B60N 2/0232
USPC ............... 297/367 P, 367 L, 378.12
See application file for complete search history.

(56) References Cited

U.S. PATENT DOCUMENTS

| | | | |
|---|---|---|---|
| 3,550,875 A | 12/1970 | Settimi | |
| 3,822,914 A * | 7/1974 | Iida | B60N 2/235 297/378.12 X |
| 3,953,069 A * | 4/1976 | Tamura | B60N 2/20 297/378.12 X |
| 5,104,084 A | 4/1992 | Kumagai | |
| 5,299,853 A | 4/1994 | Griswold | |
| 5,611,599 A * | 3/1997 | Baloche | B60N 2/2252 297/378.12 X |
| 5,755,491 A * | 5/1998 | Baloche | B60N 2/2358 297/362 |
| 5,820,218 A * | 10/1998 | Baloche | B60N 2/20 297/378.12 X |
| 5,871,259 A | 2/1999 | Gehart | |
| 6,082,821 A * | 7/2000 | Baloche | B60N 2/2358 297/378.12 X |

(Continued)

FOREIGN PATENT DOCUMENTS

| | | |
|---|---|---|
| CN | 103182961 B | 7/2015 |
| DE | 10309083 A1 | 9/2004 |

OTHER PUBLICATIONS

Office Action dated Feb. 6, 2019 for U.S. Appl. No. 15/718,089, 4111 US-U || (pp. 1-7).

(Continued)

*Primary Examiner* — Rodney B White
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom between an upright position and a folded-forward position. The occupant support further includes a seat-motion controller configured to control movement of the seat back relative to the seat bottom.

20 Claims, 11 Drawing Sheets

(56) References Cited

U.S. PATENT DOCUMENTS

| | | | |
|---|---|---|---|
| 6,454,354 B1 * | 9/2002 | Vossmann | B60N 2/236 297/367 R |
| 6,788,048 B2 | 9/2004 | Hedayat | |
| 7,192,089 B2 | 3/2007 | Boudinot | |
| 7,222,919 B2 | 5/2007 | Uramichi | |
| 7,293,752 B2 | 11/2007 | McCulloch | |
| 7,330,008 B2 | 2/2008 | Lee | |
| 7,360,838 B2 | 4/2008 | Smuk | |
| 7,552,971 B1 * | 6/2009 | Tarusawa | B60N 2/236 297/367 P |
| 7,594,699 B2 | 9/2009 | Satta | |
| 7,648,204 B2 * | 1/2010 | Oki | B60N 2/20 297/367 L |
| 7,669,931 B2 * | 3/2010 | Tarusawa | B60N 2/236 297/367 L |
| 7,722,121 B2 * | 5/2010 | Fujioka | B60N 2/236 297/367 L |
| 7,744,157 B2 * | 6/2010 | Ishihara | B60N 2/236 297/367 P |
| 7,766,429 B2 * | 8/2010 | Kuroda | B60N 2/206 297/367 P |
| 7,802,849 B2 * | 9/2010 | Tarusawa | B60N 2/236 297/367 P |
| 7,810,886 B2 * | 10/2010 | Nagura | B60N 2/236 297/367 L X |
| 7,823,978 B2 * | 11/2010 | Ishihara | B60N 2/236 297/367 L |
| 7,828,386 B2 * | 11/2010 | Reubeuze | B60N 2/2358 297/367 P |
| 7,866,753 B2 * | 1/2011 | Yamada | B60N 2/236 297/367 L |
| 7,950,741 B2 * | 5/2011 | Mitsuhashi | B60N 2/2227 297/367 L X |
| 7,967,385 B2 * | 6/2011 | Cillierre | B60N 2/236 297/367 P X |
| 7,988,233 B2 * | 8/2011 | Yamada | B60N 2/236 297/367 L |
| 7,992,938 B2 * | 8/2011 | Kojima | B60N 2/236 297/367 P X |
| 8,002,352 B2 * | 8/2011 | Yamada | B60N 2/236 297/367 L X |
| 8,002,353 B2 * | 8/2011 | Yamada | B60N 2/236 297/367 L X |
| 8,033,607 B2 * | 10/2011 | Kojima | B60N 2/2358 297/367 P X |
| 8,038,218 B2 * | 10/2011 | Wahls | B60N 2/236 297/367 L |
| 8,042,872 B2 * | 10/2011 | Kim | B60N 2/236 297/367 L |
| 8,182,039 B2 * | 5/2012 | Uramichi | B60N 2/236 297/367 P |
| 8,201,888 B2 * | 6/2012 | Fassbender | B60N 2/236 297/367 L |
| 8,267,476 B2 * | 9/2012 | Kumazaki | B60N 2/20 297/367 P |
| 8,285,454 B2 | 10/2012 | Norton | |
| 8,297,704 B2 * | 10/2012 | Endo | B60N 2/236 297/367 L |
| 8,430,453 B2 * | 4/2013 | Fujishiro | B60N 2/236 297/367 P |
| 8,449,034 B2 * | 5/2013 | Tame | B60N 2/206 297/378.12 X |
| 8,459,743 B2 * | 6/2013 | Villarroel | B60N 2/236 297/367 P |
| 8,491,054 B2 | 7/2013 | Myers | |
| 8,616,649 B2 * | 12/2013 | Uramichi | B60N 2/682 297/367 P |
| 8,641,146 B2 * | 2/2014 | Suzuki | B60N 2/2362 297/367 P |
| 8,651,578 B2 | 2/2014 | Yamada | |
| 8,708,412 B2 * | 4/2014 | Berndtson | B60N 2/236 297/367 L |
| 8,845,027 B2 | 9/2014 | Nock | |
| 8,864,234 B2 * | 10/2014 | McCulloch | B60N 2/2358 297/367 P |
| 8,882,199 B2 * | 11/2014 | Yamada | 297/367 P |
| 8,955,911 B2 * | 2/2015 | Yamada | B60N 2/236 297/367 L |
| 8,960,797 B2 * | 2/2015 | Fassbender | B60N 2/2356 297/367 L |
| 8,960,798 B2 * | 2/2015 | Ito | B60N 2/2356 297/367 P X |
| 8,985,689 B2 * | 3/2015 | McCulloch | A47C 1/026 297/367 P |
| 8,985,690 B2 * | 3/2015 | Yamada | B60N 2/2358 297/367 L X |
| 8,998,330 B2 * | 4/2015 | Ito | B60N 2/236 297/367 L |
| 9,004,601 B2 * | 4/2015 | Higashi | A47C 1/024 297/367 L |
| 9,387,781 B2 | 7/2016 | Matt | |
| 2002/0171280 A1 | 11/2002 | Okazaki | |
| 2004/0217638 A1 | 11/2004 | Shao | |
| 2006/0022503 A1 * | 2/2006 | Reubeuze | B60N 2/2358 297/378.12 |
| 2006/0202537 A1 | 9/2006 | Smuk | |
| 2007/0138854 A1 * | 6/2007 | Paing | B60N 2/20 297/378.12 |
| 2007/0289092 A1 | 12/2007 | Rohee | |
| 2008/0001458 A1 * | 1/2008 | Hoshihara | B60N 2/0232 297/362 |
| 2008/0048478 A1 * | 2/2008 | Koumura | B60N 2/20 297/367 R |
| 2008/0100115 A1 * | 5/2008 | Kojima | B60N 2/0232 297/361.1 |
| 2009/0243363 A1 * | 10/2009 | Tarusawa | B60N 2/236 297/367 P |
| 2009/0250989 A1 * | 10/2009 | Endo | B60N 2/236 297/367 P |
| 2009/0250990 A1 * | 10/2009 | Endo | B60N 2/236 297/367 P |
| 2010/0066137 A1 * | 3/2010 | Sakai | B60N 2/002 297/217.3 |
| 2010/0096895 A1 * | 4/2010 | Nonomiya | B60N 2/4228 297/367 P X |
| 2010/0109408 A1 * | 5/2010 | Ohba | B60N 2/2362 297/367 P |
| 2010/0141006 A1 * | 6/2010 | Nadgouda | B60N 2/236 297/367 P |
| 2010/0194165 A1 * | 8/2010 | Iguchi | B60N 2/2362 297/367 P |
| 2010/0244524 A1 * | 9/2010 | Kumazaki | B60N 2/12 297/341 |
| 2011/0115271 A1 * | 5/2011 | Yamada | B60N 2/236 297/367 P |
| 2011/0181088 A1 * | 7/2011 | Zhang | B60N 2/2362 297/367 P |
| 2011/0304189 A1 * | 12/2011 | Wahls | B60N 2/2356 297/367 R |
| 2012/0074750 A1 | 3/2012 | Moriyama | |
| 2012/0175932 A1 * | 7/2012 | Moriyama | B60N 2/0232 297/361.1 |
| 2012/0205956 A1 | 8/2012 | Nock | |
| 2012/0228915 A1 * | 9/2012 | Holzhueter | B60N 2/236 297/367 P |
| 2012/0261963 A1 | 10/2012 | Heyer | |
| 2013/0113261 A1 * | 5/2013 | Mikasa | B60N 2/2356 297/367 P |
| 2013/0154331 A1 * | 6/2013 | Ito | A47C 1/025 297/367 P |
| 2013/0161994 A1 * | 6/2013 | Ito | B60N 2/236 297/367 P |
| 2013/0161995 A1 * | 6/2013 | Yamada | B60N 2/12 297/367 P |
| 2013/0187426 A1 * | 7/2013 | Nagura | B60N 2/236 297/367 P |
| 2013/0320735 A1 | 12/2013 | McCulloch | |

(56) References Cited

U.S. PATENT DOCUMENTS

| | | | |
|---|---|---|---|
| 2014/0077561 A1* | 3/2014 | Sasaki | B60N 2/2356 |
| | | | 297/367 P |
| 2014/0152067 A1 | 6/2014 | Pleskot | |
| 2014/0225411 A1 | 8/2014 | Matt | |
| 2015/0069809 A1 | 3/2015 | Matt | |
| 2015/0165936 A1* | 6/2015 | Wei | B60N 2/236 |
| | | | 297/367 P |
| 2016/0023577 A1 | 1/2016 | Yamada | |
| 2016/0023578 A1 | 1/2016 | Tame | |
| 2016/0101710 A1 | 4/2016 | Bonk | |
| 2016/0280098 A1 | 9/2016 | Frye | |
| 2017/0036570 A1* | 2/2017 | Espinosa | B60N 2/2227 |
| 2017/0334320 A1* | 11/2017 | Heeg | B60N 2/0232 |
| 2019/0070980 A1* | 3/2019 | Smuk | B60N 2/20 |

OTHER PUBLICATIONS

Office Action dated Feb. 26, 2019 for U.S. Appl. No. 15/829,071, 4172 US-U ‖, (pp. 1-8).
International (PCT) Search Report and Written Opinion completed on Jul. 14, 2017 for PCT/US2017/026824, 3980 PCT ‖, 18 pages.
Extended European Search Report for European App. No. 17193929.1 established Feb. 26, 2018, 4111 EP ‖, 8 pages.

* cited by examiner

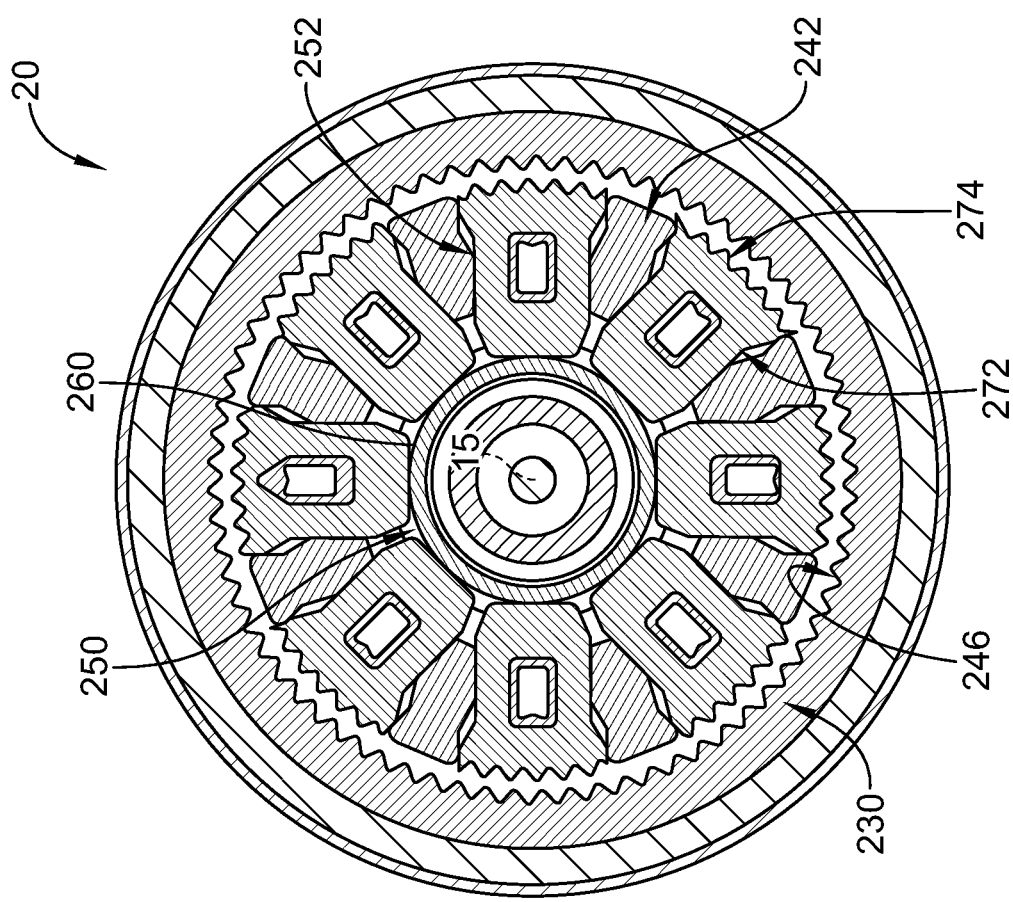
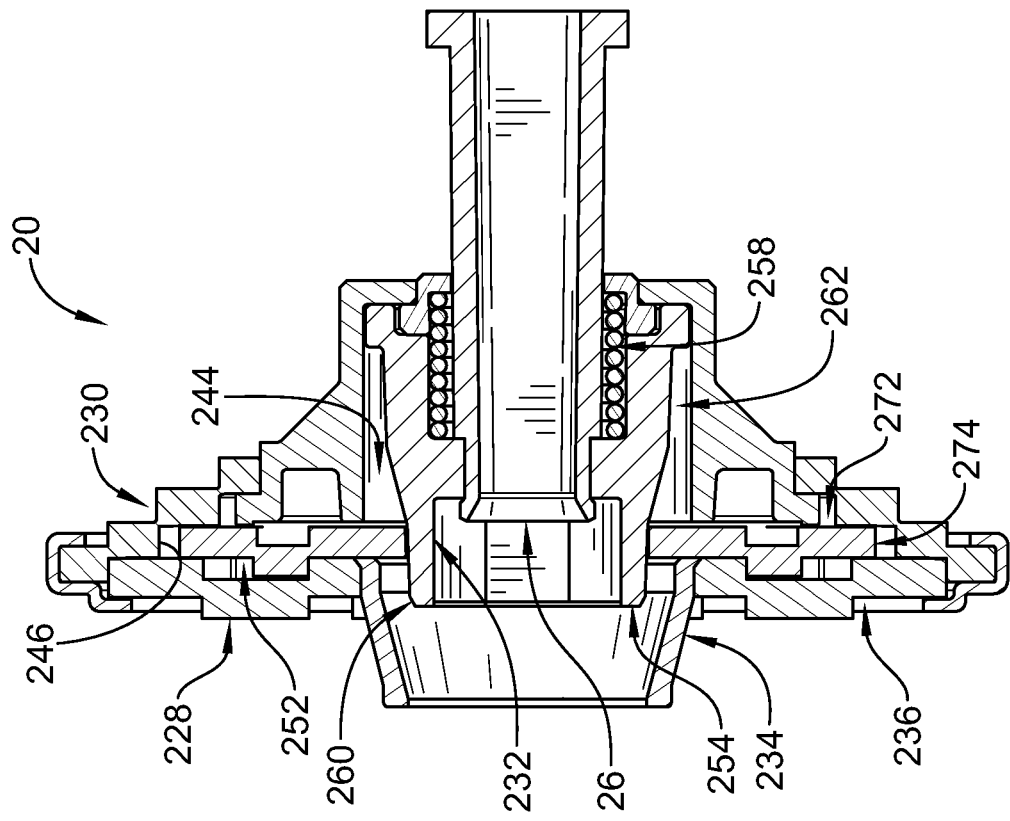

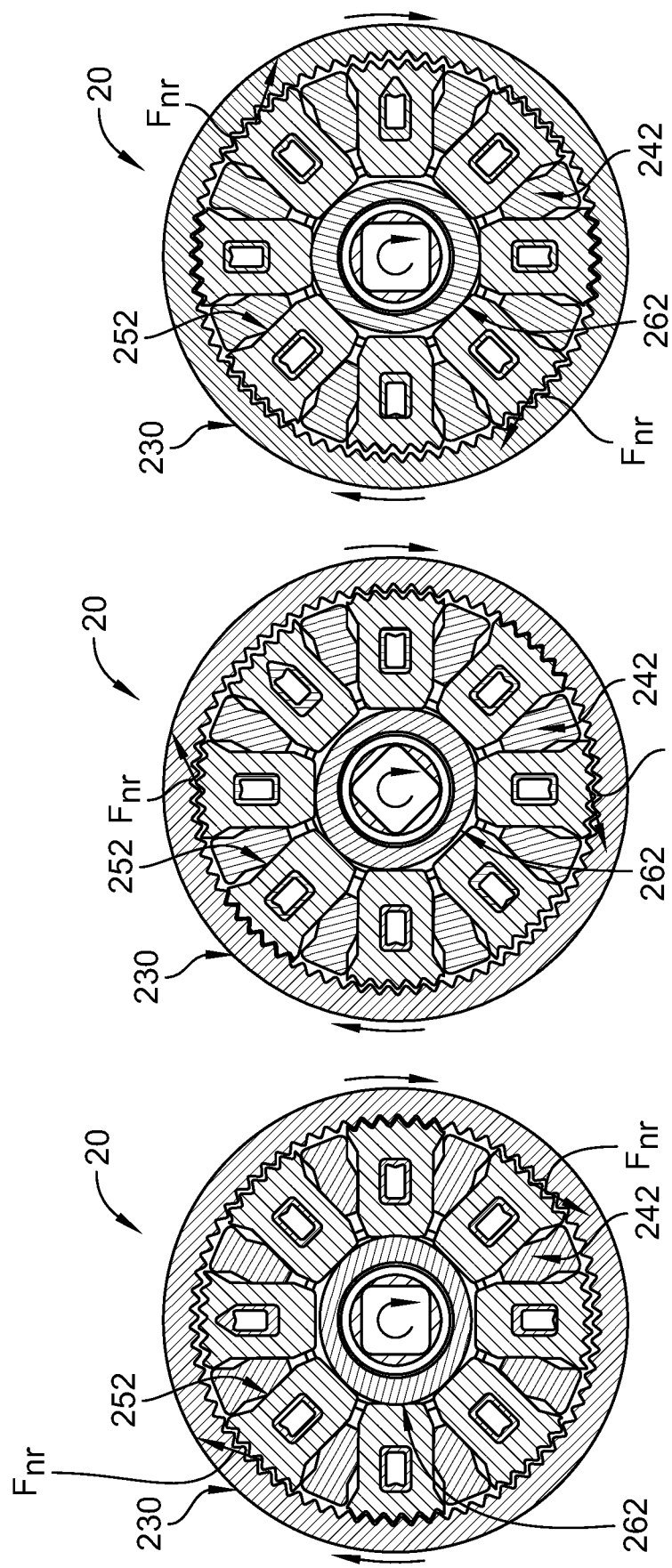

US 10,611,273 B2

RECLINER SYSTEM FOR A VEHICLE SEAT

PRIORITY CLAIM

This application claims priority under 35 U.S.C. § 119(e) to U.S. Provisional Application Ser. No. 62/569,822, filed Oct. 9, 2017, which is expressly incorporated by reference herein.

BACKGROUND

The present disclosure relates to occupant supports, and particularly to movable occupant supports. More particularly, the present disclosure relates to occupant supports with reclining seat backs for use in vehicles.

SUMMARY

According to the present disclosure, a vehicle includes an occupant support mounted to a floor of the vehicle. The occupant support includes a seat bottom coupled to the floor of the vehicle for movement therewith and a seat back coupled to the seat bottom for movement about a seat-back pivot axis relative to the seat bottom between an upright position and a folded-forward position. The occupant support further includes a seat-motion controller configured to control movement of the seat back about the seat-back pivot axis relative to the seat bottom.

In illustrative embodiments, the seat-motion controller is configured to control movement of the occupant support. The seat-motion controller includes a lock recliner and an adjustment recliner. The lock recliner provides a high-strength lock adapted to resist relatively large moments applied to the seat back to block the seat back from moving relative to the seat bottom when the occupant support is in a fixed position mode. For example, the lock recliner is adapted to resist relatively large moments during a collision event. The adjustment recliner is configured to move selectively the seat back about the seat-back pivot axis relative to the seat bottom in response to an input.

In illustrative embodiments, the lock recliner is configured to move between an engaged arrangement in which the lock recliner blocks movement of the seat back relative to the seat bottom and a disengaged arrangement in which the lock recliner allows movement of the seat back relative to the seat bottom. The adjustment recliner is configured to move the seat back relative to the seat bottom in response to being activated when the lock recliner is in the disengaged arrangement.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 14 is a section view of the adjustment recliner after the eccentric cam-shaft unit has been moved along the seat-back pivot axis to cause the adjustment recliner to assume the disengaged arrangement to allow the mobile flange of the adjustment recliner to move relative to the fixed flange of the adjustment recliner;

FIG. 15 is a sectional view of the adjustment recliner showing that the eccentric cam-shaft unit has been moved along the seat-back pivot axis to cause the adjustment recliner to assume the disengaged arrangement in which the plurality of pawls are spaced apart from the mobile flange to allow the mobile flange of the adjustment recliner to move relative to the fixed flange of the adjustment recliner;

FIGS. 16-18 are a series of views suggesting that rotation of the cam-shaft unit included in the adjustment recliner about the seat-back pivot axis causes the eccentric shaped cam to move the plurality of pawls radially outwardly into and inwardly out of engagement with the mobile flange in a predetermined sequence and that the mating teeth of the plurality of pawls and the mobile flange applies a net rotation force to the mobile flange to cause the mobile flange to rotate about the seat-back pivot axis relative to the fixed flange;

FIG. 16 is a sectional view of the adjustment recliner showing the eccentric shaped cam included in the eccentric cam-shaft assembly in a first position in which the cam pushes a first subset of the plurality of pawls radially outward into engagement with mobile flange and suggesting that rotation of the eccentric cam-shaft assembly about the seat-back pivot axis moves the plurality of pawls radially outwardly and inwardly in the predetermined sequence to cause the mobile flange to rotate about the seat-back pivot axis relative to the fixed flange;

FIG. 17 is a view similar to FIG. 15 showing the eccentric shaped cam included in the eccentric cam-shaft assembly rotated from the first position shown in FIG. 16 to a second position in which the cam pushes a second subset of the plurality of pawls radially outward into engagement with mobile flange to cause the mobile flange to rotate about the seat-back pivot axis relative to the fixed flange;

FIG. 18 is a view similar to FIG. 17 showing the eccentric shaped cam of the eccentric cam-shaft assembly rotated from the second position shown in FIG. 17 to a third position in which the cam pushes a third subset of the plurality of pawls radially outward into engagement with mobile flange to cause the mobile flange to rotate about the seat-back pivot axis relative to the fixed flange.

DETAILED DESCRIPTION

Figure 1:
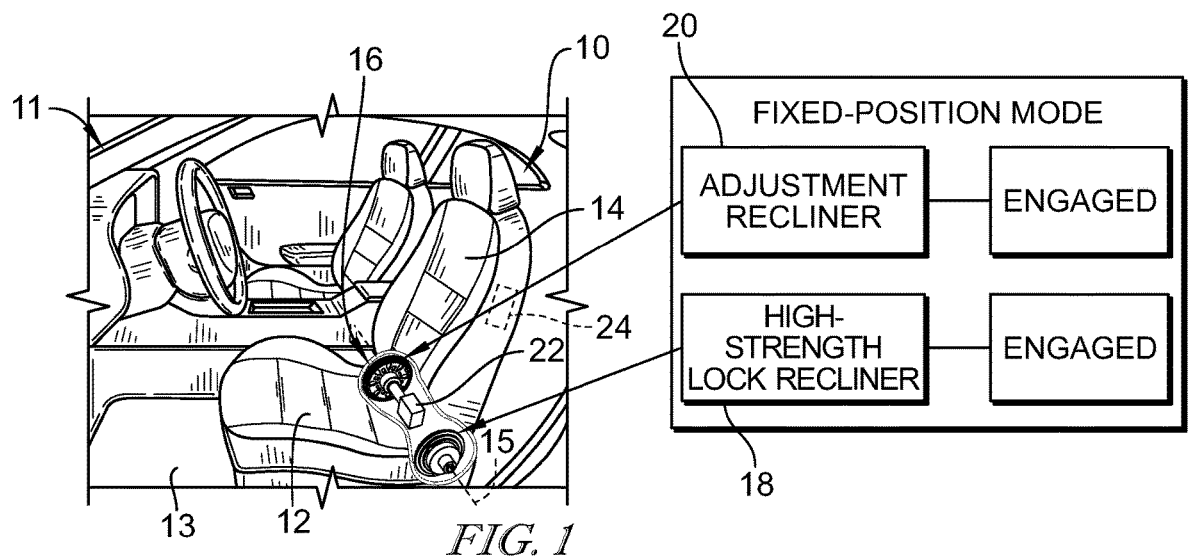
FIG. 1 is a perspective and diagrammatic view of a passenger vehicle showing an occupant support in accordance with the present disclosure on a driver side of the passenger vehicle, the occupant support includes a seat bottom mounted to a floor of the vehicle, a seat back mounted to the seat bottom to pivot relative to the seat bottom, and a seat-motion controller coupled to the seat bottom and the seat back to control motion of the seat back about a seat-back pivot axis relative to the seat bottom, and suggesting that the seat-motion controller includes an engaged adjustment recliner and an engaged lock recliner that cooperate to block movement of the seat back relative to the seat bottom in a fixed-position mode.
Figure 2:
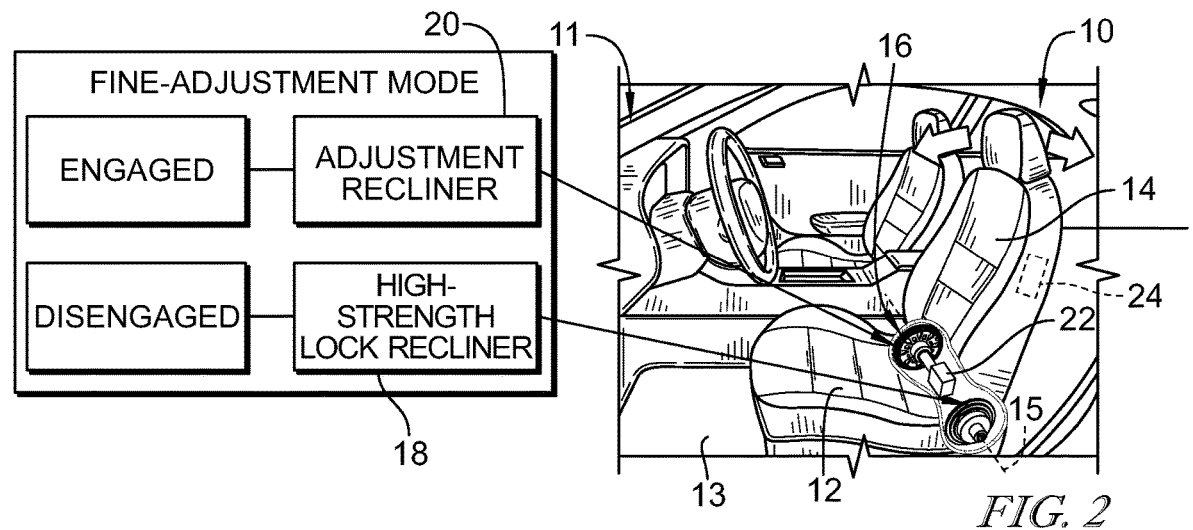
FIG. 2 is a view similar to FIG. 1 showing that the adjustment recliner is in an engaged arrangement and the lock recliner is in a disengaged arrangement to allow the occupant support to move in a fine-adjustment mode in which the seat-motion controller moves the seat back incrementally relative to the seat bottom between an upright position and a folded-forward position.
Figure 3:
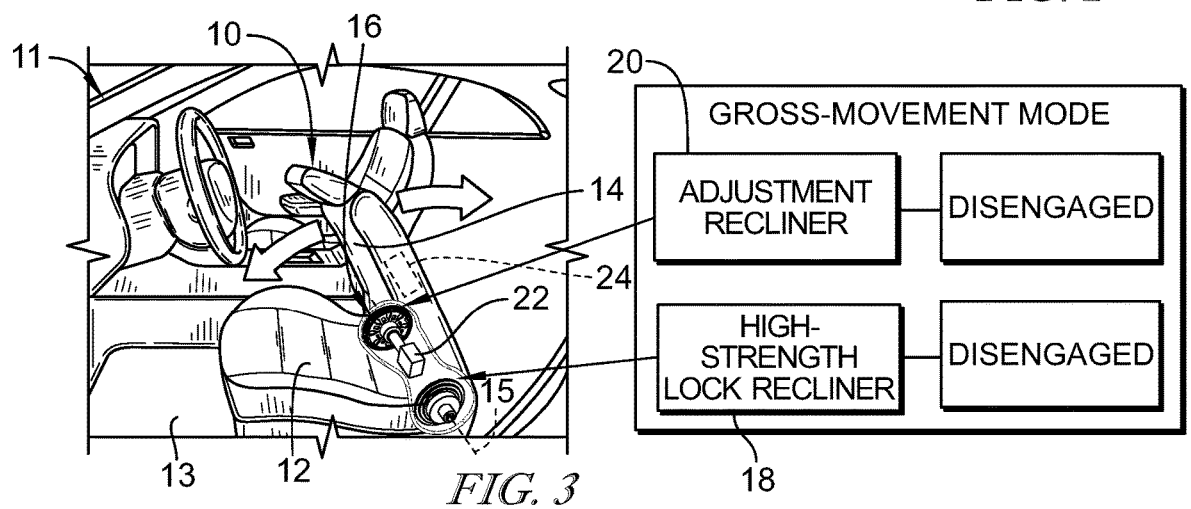
FIG. 3 is a view similar to FIG. 1 showing that the adjustment recliner is in a disengaged arrangement and the lock recliner is in a disengaged arrangement to allow the occupant support to move in a gross-movement mode in which the seat back is allowed to move liberally relative to the seat bottom between the upright position and the folded-forward position.

An occupant support 10 in accordance with the present disclosure is adapted for use in a vehicle 11 as shown in FIGS. 1-3. Occupant support 10 is configured to assume a fixed position to support an occupant in vehicle 11 as suggested in FIG. 1. Occupant support 10 is further configured to move selectively between an upright position, as shown in FIGS. 1 and 2 and a folded-forward position, as shown in FIG. 2. Occupant support 10 includes a seat-motion controller 16 that includes a lock recliner 18 and an adjustment recliner 20 that cooperate to move occupant support 10 between the upright position and the folded-forward position incrementally in a fine-adjustment mode or liberally in a gross-movement mode as suggested in FIGS. 2 and 3. In other embodiments, seat-motion controller 16 moves occupant support 10 between the upright position and the folded-forward position incrementally in the fine-adjustment mode only. In other embodiments, seat-motion controller 16 moves occupant support 10 between the upright position and the folded-forward position incrementally in the gross-movement mode only.

Occupant support 10 includes a seat bottom 12, a seat back 14, and seat-motion controller 16 as shown in FIGS. 1-4. Seat bottom 12 is coupled to a floor 13 of vehicle 11 for movement therewith. Seat back 14 is coupled to seat bottom 12 for movement about a seat-back pivot axis 15 relative to seat bottom 12 between the upright position and the folded-forward position. Seat-motion controller 16 is configured to provide means for controlling movement of seat back 14 about seat-back pivot axis 15 relative to seat bottom 12.

Lock recliner 18 and adjustment recliner 20 are included in seat-motion controller 16 and are configured to block and allow selectively movement of seat back 14 about seat-back pivot axis 15 relative to seat bottom 12 as suggested in FIGS. 1-3. Lock recliner 18 provides a high-strength lock adapted to resist relatively large moments applied to seat back 14 to block seat back 14 from moving relative to seat bottom 12 when occupant support 10 is in the fixed position mode. For example, lock recliner 18 is adapted to resist relatively large moments during a collision event. Adjustment recliner 20 is configured to move selectively seat back 14 about seat-back pivot axis 15 relative to seat bottom 12 in response to an input such as, for example, activation of a motor. Adjustment recliner 20 may provide resistance to moments applied to seat back 14.

Lock recliner 18 is movable between an engaged arrangement and a disengaged arrangement as shown in FIGS. 1-3. In the engaged arrangement, lock recliner 18 blocks movement of seat back 14 relative to seat bottom 12 to fix seat back 14 relative to seat bottom 12 as suggested in the fixed-position mode shown in FIG. 1. In the disengaged arrangement, lock recliner 18 allows movement of seat back 14 relative to seat bottom 12 as suggested in the fine-adjustment mode and the gross-movement modes shown in FIGS. 2 and 3.

Adjustment recliner 20 is movable between an engaged arrangement and a disengaged arrangement as shown in FIGS. 1-3. When lock recliner 18 is in the disengaged arrangement and adjustment recliner 20 is in the engaged arrangement, adjustment recliner 20 moves incrementally seat back 14 about seat-back pivot axis 15 relative to seat bottom 12 in the fine-adjustment mode as suggested in FIG. 2. When lock recliner 18 is in the disengaged arrangement and adjustment recliner 20 is in the disengaged arrangement, seat back 14 is free to move liberally about seat-back pivot axis 15 relative to seat bottom 12 in the gross-adjustment mode as suggested in FIG. 3. When lock recliner 18 is in the engaged arrangement, adjustment recliner 20 is blocked from moving seat back 14 relative to seat bottom 12 as suggested in FIG. 1.

Seat back 14 may be powered electrically or manually in each of the fine-adjustment mode and the gross-movement mode. In other embodiments, adjustment recliner 20 remains engaged and is not movable to a disengaged arrangement such that occupant support 10 is moveable only in the fine-adjustment mode. In some embodiments, seat-motion controller 16 is configured to store information indicative of a set memory position of seat back 14 relative to seat bottom 12 and to activate to move seat back 14 to the set memory position in response to an input.

Figure 5:
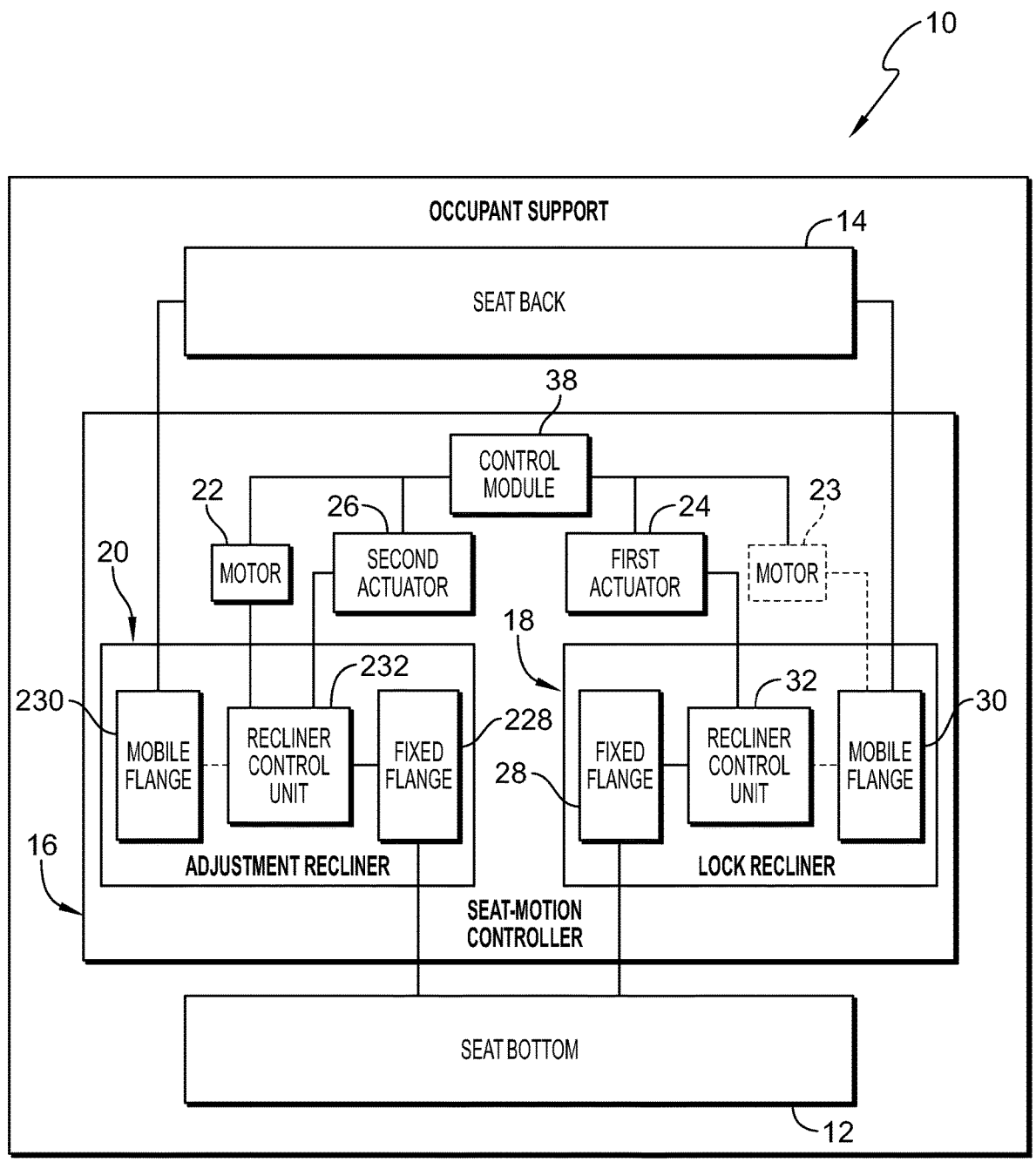
FIG. 5 is a diagrammatic view of the occupant support of FIG. 4 showing that the occupant support includes the seat back, the seat bottom, and the seat-motion controller, the seat-motion controller includes the adjustment recliner, the lock recliner, motors, actuators, and a control module, and showing that the adjustment recliner includes a mobile flange coupled to the seat back, a fixed flange coupled to the seat bottom, and a recliner control unit configured to move the mobile flange relative to the fixed flange, and further showing that the lock recliner includes a mobile flange coupled to the seat back, a fixed flange coupled to the seat bottom, and a recliner control unit configured to move the lock recliner into and out of engagement.

Occupant support 10 includes seat bottom 12, seat back 14, and seat-motion controller 16 as shown in FIGS. 1 and 5. Seat bottom 12 is coupled to floor 13 of vehicle 11 and seat back 14 is coupled to seat bottom 12 for movement about seat-back pivot axis 15 relative to seat bottom 12. Seat-motion controller 16 is configured to move occupant support 10 in one of the fine-adjustment mode and the gross-movement mode as suggested in FIGS. 1-3. In the illustrative embodiment, occupant support 10 is a driver side occupant support 10. In some embodiments, occupant support 10 includes seat integrated restraints where a lap belt is anchored on the top of a back frame.

Seat back 14 may be adjusted for a comfort of an occupant of occupant support 10 when occupant support 10 is in the fine-adjustment mode. In illustrative embodiments, seat back 14 may be adjusted between about 17 degrees and about 45 degrees when occupant support 10 is moved in the fine-adjustment mode.

Seat back 14 may be moved in the gross-movement mode to an easy entry position to allow access behind occupant support 10, for example, to allow a rear passenger to enter vehicle 11. In the illustrative embodiment, seat back 14 may be about parallel with seat bottom 12 when occupant support is in the gross-movement mode.

Figure 4:
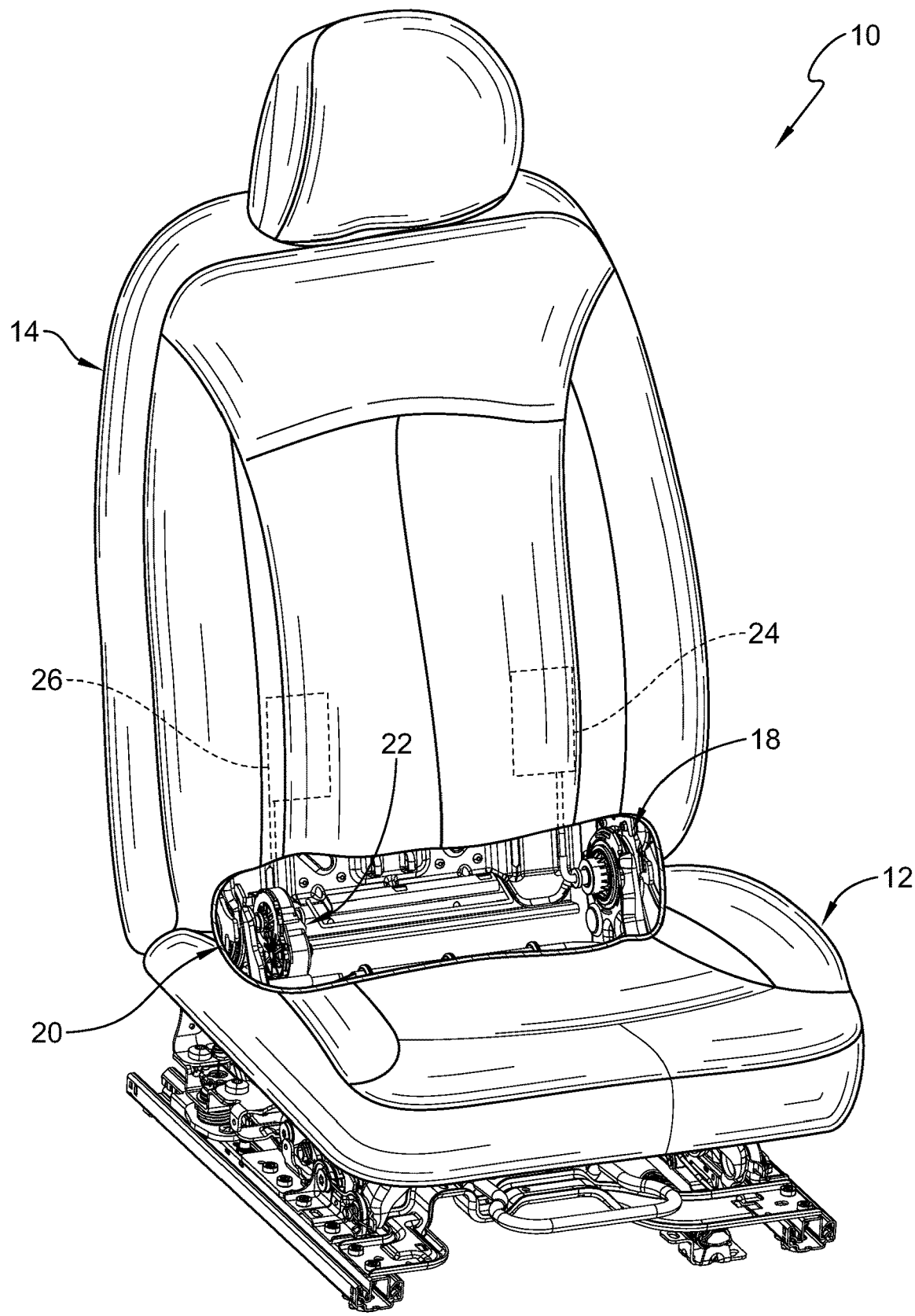
FIG. 4 is a perspective and diagrammatic view of the occupant support of FIG. 1 with portions broken away to show the adjustment recliner and the lock recliner.

Seat-motion controller 16 includes lock recliner 18 and adjustment recliner 20 as shown in FIGS. 4 and 5. Lock recliner 18 and adjustment recliner 20 are included in seat-motion controller 16 and are configured to block and allow selectively movement of seat back 14 about seat-back pivot axis 15 relative to seat bottom 12 as suggested in FIGS. 1-3. In the illustrative embodiment, lock recliner 18 is spaced apart from adjustment recliner 20.

Illustratively, seat-motion controller 16 further includes a motor 22, a first actuator 24, a second actuator 26, and a control module 38 as shown in FIG. 5. Motor 22 is configured to drive adjustment recliner 20. First actuator 24 is configured to move lock recliner 18 between the engaged arrangement and the disengaged arrangement. Second actuator 26 is configured to move adjustment recliner 20 between the engaged arrangement and the disengaged arrangement. In some embodiments, seat-motion controller 16 includes a second motor 23 configured to drive lock recliner 18 in the gross-movement mode. In the illustrative embodiment, lock recliner 18 is not motor driven for rotation. Control module 38 is configured to control motor 22, first actuator 24, and second actuator 26.

Lock recliner 18 is movable between the engaged arrangement and the disengaged arrangement as shown in FIGS. 1-3. In the engaged arrangement, lock recliner 18 blocks movement of seat back 14 relative to seat bottom 12 to fix seat back 14 relative to seat bottom 12 as suggested in the fixed-position mode shown in FIG. 1. In the disengaged arrangement, lock recliner 18 allows movement of seat back 14 relative to seat bottom 12 as suggested in the fine-adjustment mode and the gross-movement modes shown in FIGS. 2 and 3.

Figure 6:
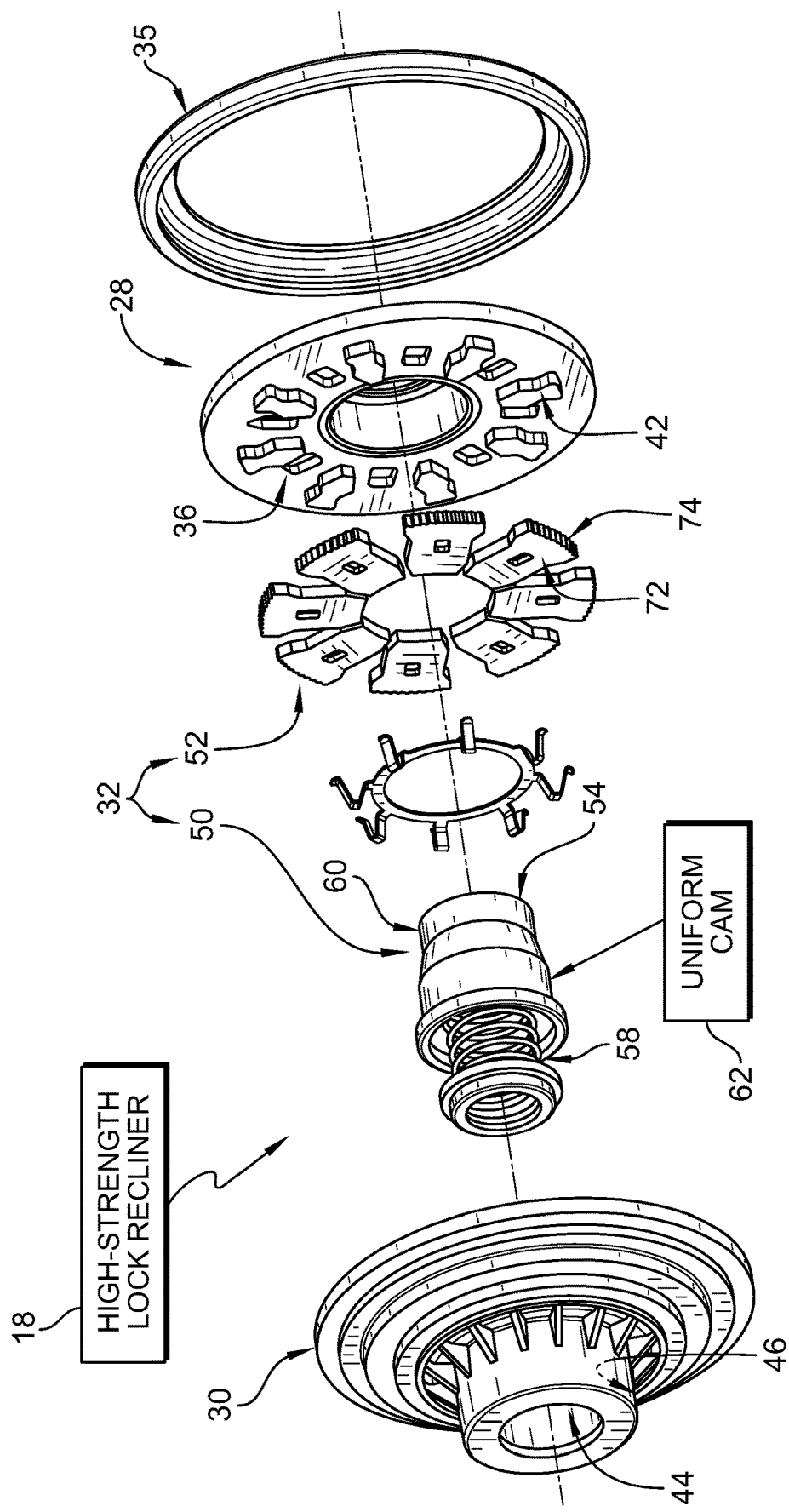
FIG. 6 is an exploded assembly view of the lock recliner showing that the lock recliner unit includes, from left to right, the mobile flange, the recliner control unit including a cam-shaft unit and a plurality of pawls, and the fixed flange.

Lock recliner 18 includes a fixed flange 28, a mobile flange 30, and a recliner control unit 32 as shown in FIGS. 5 and 6. Fixed flange 28 is coupled to seat bottom 12 and blocked from rotating about seat-back pivot axis 15 relative to seat bottom 12. Mobile flange 30 is coupled to seat back 14 and configured to rotate with seat back 14 relative to fixed flange 28 and seat bottom 12 when lock recliner is in the disengaged arrangement. Recliner control unit 32 is configured to engage mobile flange 30 to block rotation of mobile flange 30 relative to fixed flange 28 when lock recliner 18 is in the engaged arrangement. Recliner control unit 32 is configured to disengage mobile flange 30 to allow rotation of mobile flange 30 relative to fixed flange 28 when lock recliner 18 is in the engaged arrangement.

Figure 8:
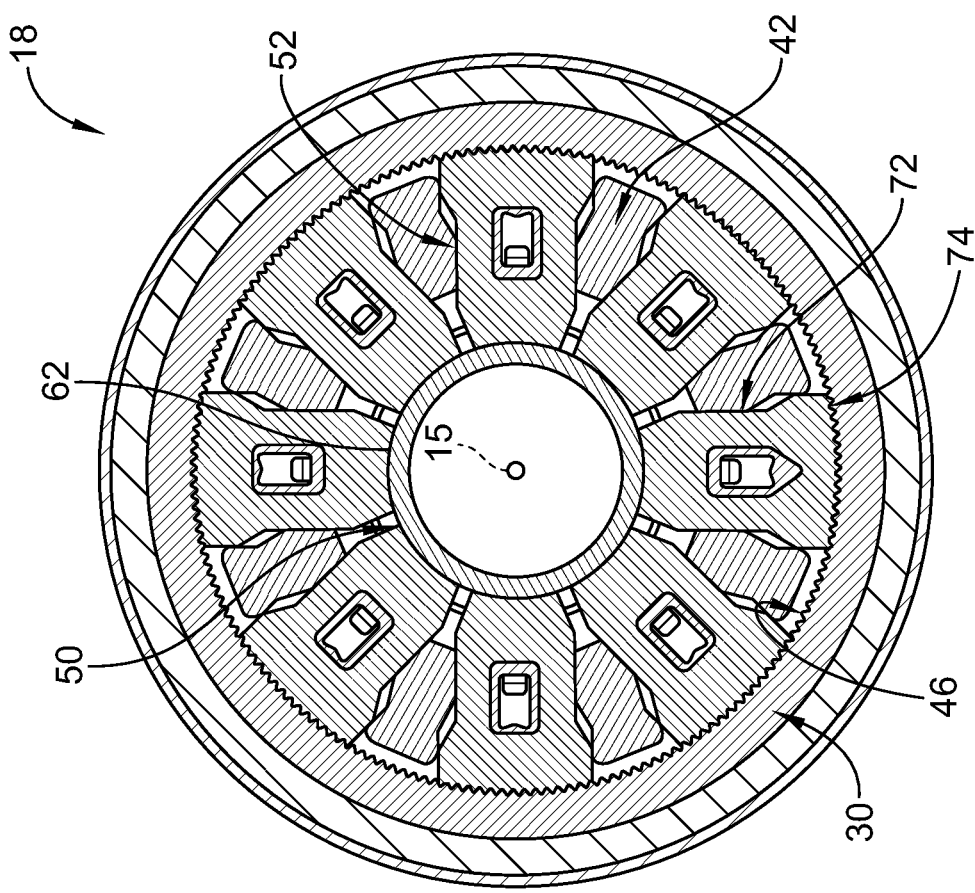
FIG. 8 is a section view of the lock recliner showing that the mobile flange is arranged around the recliner control unit and that the cam included in the uniform cam-shaft unit has an round shape configured to push the plurality of pawls radially outward into engagement with the mobile flange to lock the seat back in a selected memory position.
Figure 7:
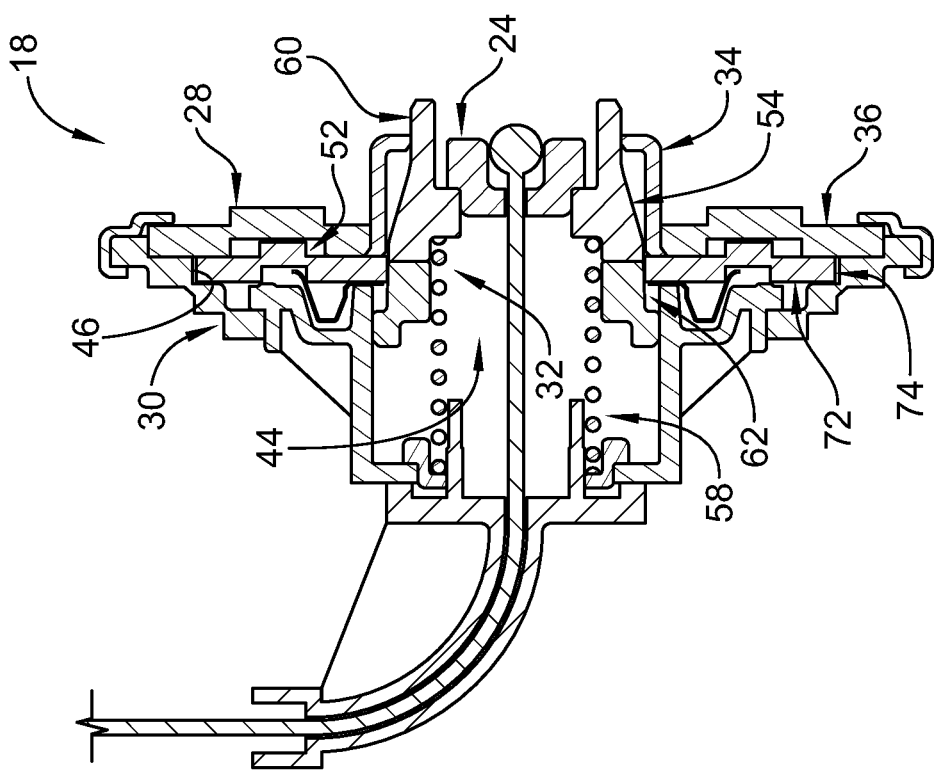
FIG. 7 is a section view of the lock recliner showing that the fixed flange and the mobile flange are adjacent one another and the recliner control unit extends into the mobile flange and the fixed flange and further showing that the uniform cam-shaft unit is in an extended position to cause a cam included in the uniform cam-shaft unit to be aligned with the plurality of pawls so that the lock recliner is in the engaged arrangement.
Figure 10:
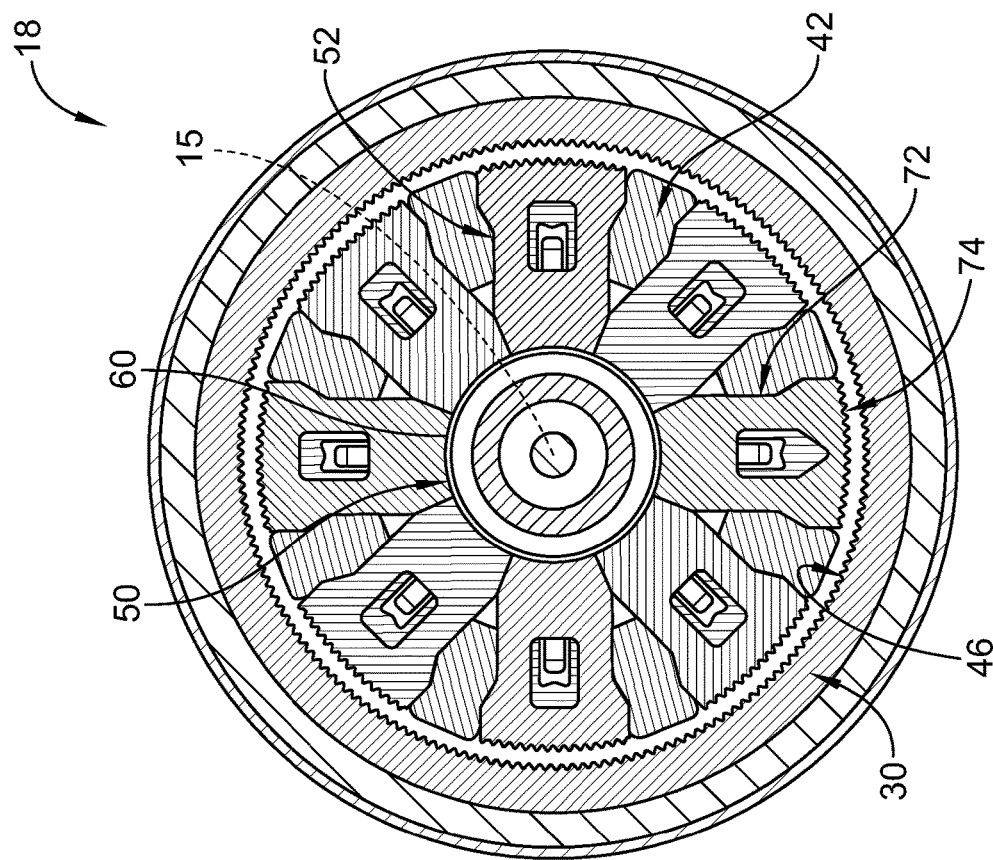
FIG. 10 is a sectional view of the lock recliner showing that the uniform cam-shaft unit has been moved along the seat-back pivot axis to cause the lock recliner to assume the disengaged arrangement in which the plurality of pawls are spaced apart from the mobile flange to allow the mobile flange of the lock recliner to move relative to the fixed flange of the lock recliner.

Fixed flange 28 includes a bushing 34, a static disc 36, and an outer ring 35 as shown in FIGS. 6 and 7. Bushing 34 is arranged circumferentially about seat-back pivot axis 15 and coupled to static disc 36. Static disc 36 is coupled to seat bottom 12 for movement therewith. Illustratively, static disc 36 is welded to seat bottom 12. In other embodiments, static disc 36 is coupled to seat bottom 12 by fasteners or any other suitable alternative. Static disc 36 is formed to include pawl guides 42 as shown in FIGS. 6, 8, and 10. Pawl guides 42 extend axially away from static disc 36 and are arranged circumferentially about seat-back pivot axis 15. Pawl guides 42 limit movement of pawls 52 included in recliner control unit 32 to radial in-and-out movement. Outer ring 35 extends around and is coupled with static disc 36.

Mobile flange 30 is formed to include an aperture 44 and a plurality of flange teeth 46 as shown in FIGS. 6, 8, and 10. Recliner control unit 32 extends through aperture 44 formed in mobile flange 30. The plurality of flange teeth 46 are arranged circumferentially about seat-back pivot axis 15 and extend radially inwardly toward seat-back pivot axis 15.

Recliner control unit 32 is configured to move lock recliner 18 between the engaged arrangement and the disengaged arrangement as suggested in FIGS. 7-10. Reference is hereby made to P.C.T. Application No. PCT/US17/26824 filed Apr. 4, 2017, published as WO 2017/180520, and titled RECLINER FOR A VEHICLE SEAT for disclosure relating to such recliner control unit, which application is hereby incorporated in its entirety herein.

Recliner control unit 32 includes a uniform cam-shaft unit 50 and plurality of pawls 52 as shown in FIG. 6. Uniform cam-shaft unit 50 extends along seat-back pivot axis 15 and is configured to move axially along seat-back pivot axis 15. The plurality of pawls 52 are arranged circumferentially about uniform cam-shaft unit 50 and move radially outwardly and inwardly relative to seat-back pivot axis 15 in response to axial movement of uniform cam-shaft unit 50.

Figure 9:
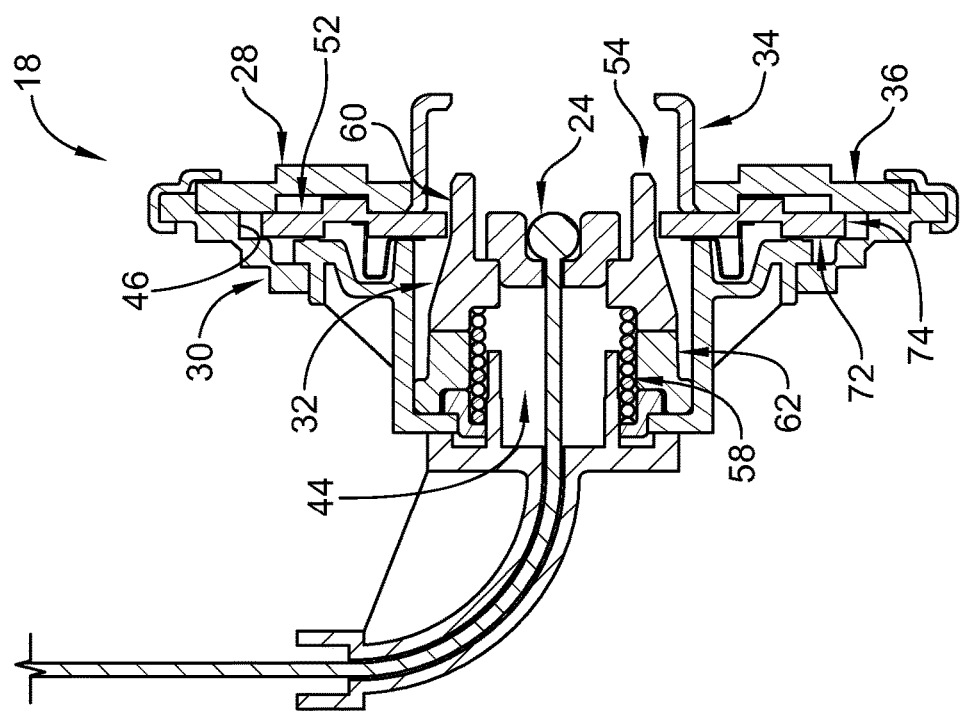
FIG. 9 is a section view of the lock recliner after the uniform cam-shaft unit has been moved along the seat-back pivot axis to cause the lock recliner to assume the disengaged arrangement to allow the mobile flange of the lock recliner to move relative to the fixed flange of the lock recliner.

Uniform cam-shaft unit 50 is coupled to first actuator 24 and is configured to be moved axially relative to seat-back pivot axis 15 by first actuator 24 as suggested in FIGS. 7 and 9. Uniform cam-shaft unit 50 is configured to move axially between an extended position and a retracted position to move lock recliner 18 between the engaged arrangement and the disengaged arrangement. In the illustrative example, lock recliner 18 is in the engaged arrangement when uniform cam-shaft unit 50 is in the extended position, as suggested in FIGS. 7 and 8, and lock recliner 18 is in the disengaged arrangement when uniform cam-shaft unit 50 is in the retracted position as suggested in FIGS. 9 and 10.

Uniform cam-shaft unit 50 includes a rotor 54 and a bias member 58 as shown in FIG. 7. Rotor 54 is configured to push pawls 52 radially outward toward mobile flange 30 or allow pawls 52 to move radially inward toward seat-back pivot axis 15. Bias member 58 is positioned between rotor 54 and mobile flange 30 and biases rotor 54 toward fixed flange 28 to bias uniform cam-shaft unit 50 toward the extended position and away from the retracted position as suggested in FIG. 7.

Rotor 54 includes central hub 60 and cam 62 as shown in FIG. 7. Central hub 60 extends axially along seat-back pivot axis 15 and has a maximum radius that is smaller than a maximum radius of cam 62. Cam 62 extends radially outward away from central hub 60 toward the plurality of pawls 52.

Central hub 60 is aligned axially with pawls 52 when uniform cam-shaft unit 50 is in the retracted position to provide space for pawls 52 to move radially inward away from mobile flange 30 toward seat-back pivot axis 15 as shown in FIG. 9. Cam 62 is circular and uniform and aligned axially with pawls 52 when uniform cam-shaft unit 50 is in the extended position and pushes the pluralities of pawls 52 radially outward toward mobile flange 30 as shown in FIG. 8.

First actuator 24 is coupled to rotor 54 as shown in FIGS. 7 and 9. Bias member 58 urges rotor 54 axially to push uniform cam-shaft unit 50 toward the extended position as suggested in FIG. 7. First actuator 24 overcomes bias member 58 and moves rotor 54 axially in response to an input to move uniform cam-shaft unit 50 to the retracted position suggested in FIG. 9 to move lock recliner 18 to the disengaged arrangement.

Each pawl 52 includes a pawl body 72 and a plurality of pawl teeth 74 that extend radially outward away from pawl body 72 as shown in FIGS. 6 and 8. Pawl teeth 74 are adapted to engage and disengage flange teeth 46 included in mobile flange 30 to block movement of mobile flange 30. Pawl teeth 74 pawls 52 engage flange teeth 46 included in mobile flange 30 to block rotation of mobile flange 30 when lock recliner 18 is in the engaged arrangement as shown in FIG. 8. Pawl teeth 74 are spaced apart from flange teeth 46 when lock recliner 18 is in the disengaged arrangement to allow adjustment recliner 20 to rotate seat back 14 as suggested in FIGS. 9 and 10.

Adjustment recliner 20 is configured to move selectively seat back 14 about seat-back pivot axis 15 relative to seat bottom 12 in response to an input such as, for example, activation of a motor or manual input from the occupant. Adjustment recliner 20 may provide resistance to moments applied to seat back 14.

Adjustment recliner 20 is movable between the engaged arrangement and the disengaged arrangement as shown in FIGS. 1-3. In the engaged arrangement, adjustment recliner 20 may resist movement of seat back 14 relative to seat bottom 12 to fix seat back 14 relative to seat bottom 12 as suggested in the fixed-position mode shown in FIG. 1. In the disengaged arrangement, adjustment recliner 20 is configured to move seat back 14 relative to seat bottom 12 when lock recliner 18 is also disengaged as suggested in the fine-adjustment mode and the gross-movement modes shown in FIGS. 2 and 3.

Figure 11:
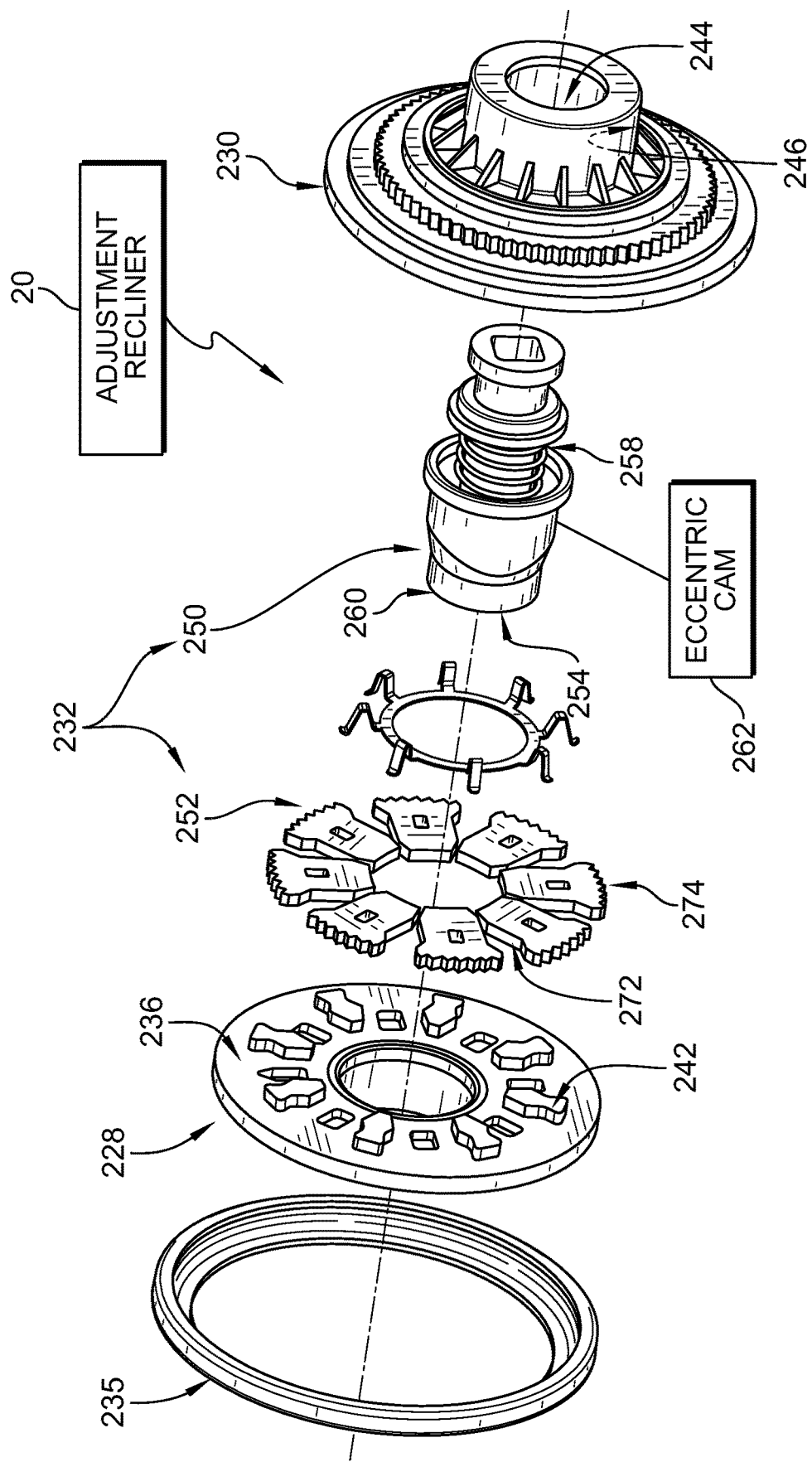
FIG. 11 is an exploded assembly view of the adjustment recliner showing that the adjustment recliner unit includes, from left to right, the mobile flange, the recliner control unit including an eccentric cam-shaft unit and a plurality of pawls, and the fixed flange.

Adjustment recliner 20 includes a fixed flange 228, a mobile flange 230, and a recliner control unit 232 as shown in FIG. 11. Fixed flange 228 is coupled to seat bottom 12 and is blocked from rotating about seat-back pivot axis 15 relative to seat bottom 12. Mobile flange 230 is coupled to seat back 14 and configured to be rotated by recliner control unit 232 relative to fixed flange 228 and seat bottom 12 when lock recliner 18 is in the disengaged arrangement. Recliner control unit 232 is configured to control rotation of mobile flange 230.

Figure 13:
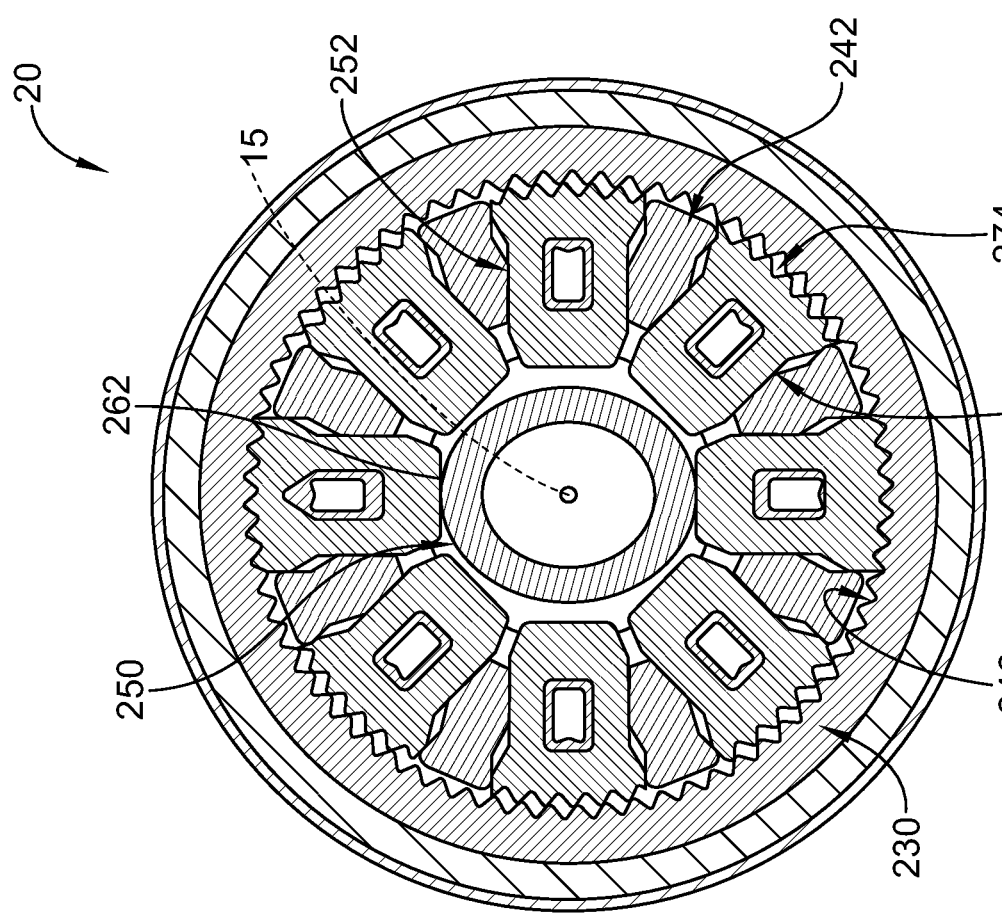
FIG. 13 is a section view of the adjustment recliner showing that the mobile flange is arranged around the recliner control unit and that the cam included in the cam-shaft unit has an eccentric shape configured to push at least one and less than all of the plurality of pawls radially outward into engagement with the mobile flange.
Figure 12:
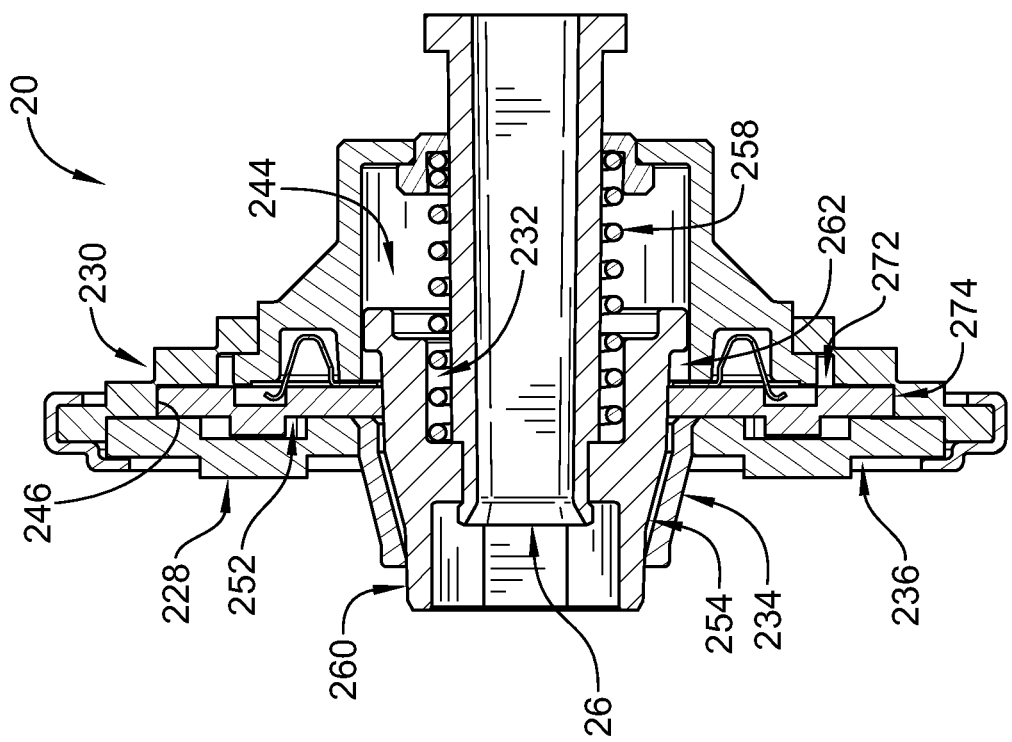
FIG. 12 is a section view of the adjustment recliner showing that the fixed flange and the mobile flange of the adjustment recliner are adjacent one another and the recliner control unit extends into the mobile flange and the fixed flange and further showing that the eccentric cam-shaft unit is in an extended position to cause a cam included in the cam-shaft unit to be aligned with the plurality of pawls so that the adjustment recliner is in the engaged arrangement in which at least one pawl meshes with the mobile flange.

Fixed flange 228 includes a bushing 234, a static disc 236, and outer ring 235 as shown in FIGS. 11 and 12. Bushing 234 is arranged circumferentially about seat-back pivot axis 15 and coupled to static disc 236. Static disc 236 is coupled to seat bottom 12 for movement therewith. Illustratively, static disc 236 is welded to seat bottom 12. In other embodiments, static disc 236 is coupled to seat bottom 12 by fasteners or any other suitable alternative. Static disc 236 is formed to include pawl guides 242 as shown in FIGS. 11, 13, and 15. Pawl guides 242 extend axially away from static disc 236 and are arranged circumferentially about seat-back pivot axis 15. Pawl guides 242 limit movement of pawls 252 included in a recliner control unit 232 to radial in-and-out movement. Outer ring 235 extends around and is coupled with static disc 236.

Mobile flange 230 is formed to include an aperture 244 and a plurality of flange teeth 246 as shown in FIGS. 11, 13, and 15. Recliner control unit 232 extends through aperture 244 formed in mobile flange 230. The plurality of flange teeth 246 are arranged circumferentially about seat-back pivot axis 15 and extend radially inwardly toward seat-back pivot axis 15.

Recliner control unit 232 is configured to move adjustment recliner 20 between the engaged arrangement and the disengaged arrangement as suggested in FIGS. 12-15. Reference is hereby made to PCT Application No. PCT/US17/26824 filed Apr. 4, 2017, published as WO 2017/180520, and titled RECLINER FOR A VEHICLE SEAT for disclosure relating to such recliner control unit, which application is hereby incorporated in its entirety herein.

Recliner control unit 232 includes an eccentric cam-shaft unit 250 and plurality of pawls 252 as shown in FIG. 11. Eccentric cam-shaft unit 250 extends along seat-back pivot axis 15 and is configured to move axially along seat-back pivot axis 15. The plurality of pawls 252 are arranged circumferentially about cam-shaft unit 250 and move radially outwardly and inwardly relative to seat-back pivot axis 15 in response to rotation of cam-shaft unit 250.

Eccentric cam-shaft unit 250 is coupled to second actuator 26 and is configured to be moved axially relative to seat-back pivot axis 15 by second actuator 26 as suggested in FIGS. 12 and 14. Cam-shaft unit 250 is configured to move axially between an extended position and a retracted position to move adjustment recliner 20 between the engaged arrangement and the disengaged arrangement. In the illustrative example, adjustment recliner 20 is in the engaged arrangement when cam-shaft unit 250 is in the extended position, as suggested in FIGS. 12 and 13, and adjustment recliner 20 is in the disengaged arrangement when cam-shaft unit 250 is in the retracted position as suggested in FIGS. 14 and 15.

Eccentric cam-shaft unit 250 includes a rotor 254 and a bias member 258 as shown in FIGS. 11 and 12. Rotor 254 is configured to push pawls 252 radially outward toward mobile flange 230 or allow pawls 252 to move radially inward toward seat-back pivot axis 15. Bias member 258 is positioned between rotor 254 and mobile flange 230 and biases rotor 254 away from mobile flange 230 to bias eccentric cam-shaft unit 250 toward the extended position and away from the retracted position as suggested in FIG. 12.

Rotor 254 includes central hub 260 and cam 262 as shown in FIGS. 11 and 12. Central hub 260 extends axially along seat-back pivot axis 15 and has a maximum radius that is smaller than a maximum radius of cam 262. Cam 262 extends radially outward away from central hub 260 toward the plurality of pawls 252.

Central hub 260 is aligned axially with pawls 252 when cam-shaft unit 250 is in the retracted position to provide space for pawls 252 to move radially inward away from mobile flange 230 toward seat-back pivot axis 15 as shown in FIGS. 14 and 15. Cam 262 is eccentric shaped and aligned axially with pawls 252 when cam-shaft unit 250 is in the extended position and pushes the pluralities of pawls 252 radially outward toward mobile flange 230 as shown in FIGS. 12 and 13. Cam 262 pushes at least one and less than all of the pawls 252 into engagement with the mobile flange 230 as shown in FIG. 13.

Second actuator 26 is coupled to rotor 254 as shown in FIGS. 12 and 14. Bias member 258 urges rotor 254 axially to push cam-shaft unit 250 toward the extended position as suggested in FIG. 12. Second actuator 26 overcomes bias member 258 and moves rotor 254 axially in response to an input to move eccentric cam-shaft unit 250 to the retracted position suggested in FIG. 14 to move adjustment recliner 20 to the disengaged arrangement.

Each pawl 252 includes a pawl body 272 and a plurality of pawl teeth 274 that extend radially outward away from pawl body 272 as shown in FIGS. 11 and 13. Pawl teeth 274 are adapted to engage and disengage flange teeth 246 included in mobile flange 230 to block movement of mobile flange 230 and to cause incremental rotation of mobile flange 230. Illustratively, pawl teeth 274 are larger than pawl teeth 74 included in the lock recliner 18. Relatively smaller pawl teeth 74 may allow lock recliner 18 to lock more easily, provide a stronger lock force, and/or lock at more rotational positions to minimize slack when locking the seat as compared to recliner 20.

Some pawl teeth 274 engage flange teeth 246 included in mobile flange 230 to block rotation of mobile flange 230 when adjustment recliner 20 is in the engaged arrangement and cam-shaft unit 250 is not rotated. Rotation of cam-shaft unit 250 causes the plurality of pawls 252 to move radially inward and outward relative to seat-back pivot axis 15 in a predetermined sequence to cause the plurality of pawls 252 to rotate mobile flange 230 incrementally. As rotor 254 rotates, peaks of cam 262 push pawls 252 radially outward sequentially to cause pawls 252 to apply net rotation force $F_{nr}$ to mobile flange 230 which causes mobile flange 230 to rotate (sometimes called walking pawls) as suggested in FIGS. 16-18.

In the fine-adjustment mode, mobile flange 230 rotates with a transmission ratio defined by a degree of rotation of cam 262 and a degree of rotation of mobile flange 230. In some embodiments, seat-motion controller 16 has a transmission ratio of about 37:1. Mobile flange 230 includes 74 teeth is some embodiments.

Pawl teeth 274 are spaced apart from flange teeth 246 when adjustment recliner 20 is in the disengaged arrangement. Seat back 14 is free to move liberally in the gross movement mode when adjustment recliner 20 and lock recliner 18 are in the disengaged arrangement as suggested in FIG. 3. In the illustrative embodiment, seat back 14 is powered manually in the gross-movement mode. In other embodiments, seat back 14 is powered electrically in the gross-movement mode.

During operation, the occupant activates a lever/button to adjust an angle of seat back 14 relative to seat bottom 12 in the fine-adjustment mode. Control module 38 sends a first signal to first actuator 24, which moves lock recliner 18 from the engaged arrangement to the disengaged arrangement. After a slight delay in some embodiments, control module 38 sends a second signal to the motor 22 connected to the adjustment recliner to power the adjustment recliner and adjust the angle of seat back 14 incrementally in the fine-adjustment mode. In some embodiments, the slight delay is 1 second or less.

Adjustment continues in the fine-adjustment mode as long as the lever/button is activated. When seat back 14 reaches the desired position, the lever/button is released and deactivated. Control module 38 instructs first actuator to cooperate with bias member 58 to move lock recliner 18 to the engaged arrangement. Control module 38 maintains sending power to adjustment recliner 20 for a short period of time and then rotates adjustment recliner 20 in an opposite direction to assure full engagement of adjustment recliner 20. In some embodiments, the current of power is reversed to rotate adjustment recliner 20 in the opposite direction. In some embodiments, a position sensor is used with lock recliner 18 to confirm the full engagement of lock recliner 18.

In another operation, the occupant activates a lever/button to adjust the angle of seat back 14 relative to seat bottom 12 in the gross-movement mode. Control module 38 sends a first signal to first actuator 24, which moves lock recliner 18 from the engaged arrangement to the disengaged arrangement as suggested in FIG. 3. At the same time, control module 38 sends a second signal to the second actuator 26 connected to the adjustment recliner 20 to move adjustment recliner 20 from the engaged arrangement to the disengaged arrangement as suggested in FIG. 3. The occupant is then free to manually move seat back 14 relative to seat bottom 12 in the gross-movement mode. In other embodiments, control module 38 powers one of the adjustment recliner 20 and the lock recliner 18 which rotates the seat back 14 liberally as compared to the fine-adjustment mode to adjust the angle of seat back 14.

Figure 19:
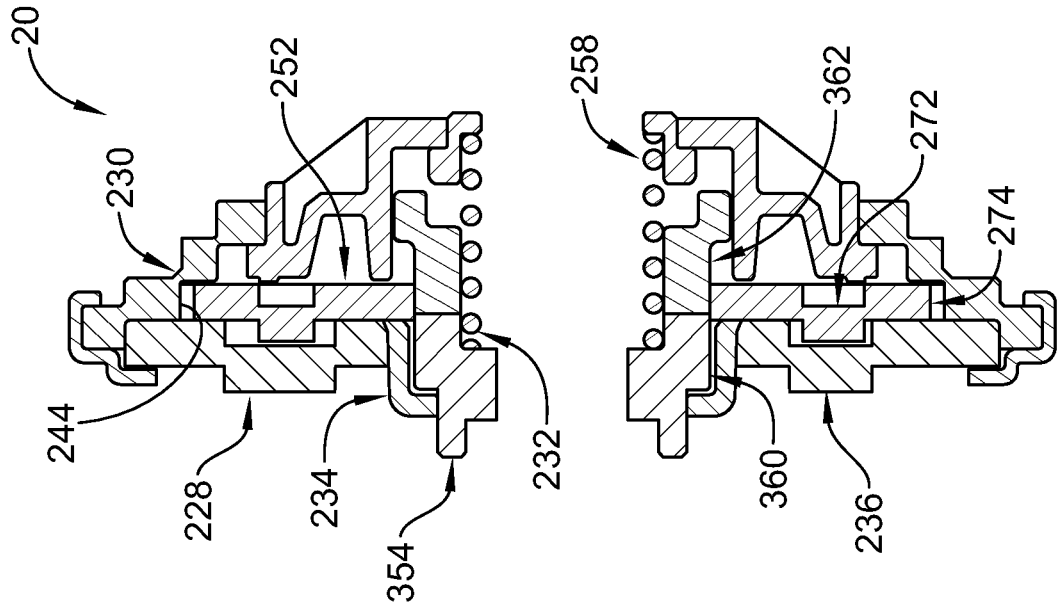
FIG. 19 is a view similar to FIG. 7 of another embodiment of the adjustment recliner suggesting that the cam-shaft assembly is formed to push the plurality of pawls radially outward in an extended position and a retracted position of the cam-shaft assembly so that the plurality of pawls may not be spaced apart from the mobile flange included in the adjustment recliner.

In another embodiment, adjustment recliner 20 includes a rotor 354 as shown in FIG. 19. Rotor 354 includes a central hub 360 and a cam 362. Central hub 260 extends axially along seat-back pivot axis 15 and has a maximum radius that is about equal to a maximum radius of cam 362. As a result, rotor 354 pushes at least one pawl 252 toward mobile flange 230. Adjustment recliner 20 remains in the engaged arrangement such that seat back 14 is movable in the fine-adjustment mode and not movable in the gross-movement mode.

In some embodiments, control module 38 is configured to store information indicative of a set memory position of seat back 14 relative to seat bottom 12. Control module 38 is configured to activate lock recliner 18 and adjustment recliner 20 to return seat back 14 to the set memory position in response to an input. Control module 38 may include one or more of a potentiometer, a hall-effect sensor, a controller configured to ripple count, an accelerometer, and a radio-frequency identification sensor.

In some embodiments, lock recliner 18 has a larger diameter than adjustment recliner 20. In some embodiments, mobile flange 30 and pawls 52 of lock recliner 18 are larger in size and diameter than mobile flange 230 and pawls 252 of adjustment recliner 20. In some embodiment, lock recliner 18 includes 8 pawls 52 and the teeth of each pawl 52 mesh with the teeth of mobile flange 30 when lock recliner 18 is in the disengaged arrangement. In some embodiments, teeth of pawls 52 have a pitch of about 2 degrees.

A method in accordance with the present disclosure may include a number of steps. The method may include providing an occupant support 10 that includes seat bottom 12, seat back 14, and seat-motion controller 16, seat-motion controller 16 includes lock recliner 18 and adjustment recliner 20, moving lock recliner 18 from the engaged arrangement to the disengaged arrangement in response to a fine-adjustment input, powering adjustment recliner 20 with motor 22 to rotate seat back 14 in a first direction and a first speed relative to seat bottom 12 in response to the fine-adjustment input, and moving lock recliner 18 from the engaged arrangement to the disengaged arrangement in response to the fine-adjustment input ending.

In some embodiments, the method includes moving lock recliner 18 from the engaged arrangement to the disengaged arrangement in response to a gross-movement input. In some embodiments, the method includes moving adjustment recliner 20 from an engaged arrangement to a disengaged arrangement in response to the gross-movement input.

In some embodiments, the method includes rotating seat back 14 at a second speed different than the first speed relative to seat bottom 12. In some embodiments, the method includes moving lock recliner 18 from the disengaged arrangement to the engaged arrangement and moving adjustment recliner 20 from the disengaged arrangement to the engaged arrangement after rotating seat back 14 at the second speed. In some embodiments, motor 22 is configured to power adjustment recliner 20 to rotate seat back 14 at the second speed.

In some embodiments, the method further includes powering adjustment recliner 20 with motor 22 to rotate seat back 14 in a second direction opposite the first direction relative to seat bottom 12 in response to the fine-adjustment input ending after lock recliner 18 is moved from the disengaged arrangement to the engaged arrangement.

The invention claimed is:

1. An occupant support comprising:
a seat bottom,
a seat back coupled to the seat bottom for movement about a seat-back pivot axis relative to the seat bottom between an upright position and a folded-forward position, and
a seat-motion controller configured to control movement of the occupant support, the seat-motion controller including a lock recliner configured to move between an engaged arrangement and a disengaged arrangement and a separate adjustment recliner spaced apart laterally from the lock recliner, the lock recliner provides a high-strength lock adapted to resist relatively large moments applied to the seat back to block the seat back from moving relative to the seat bottom when the lock recliner is in the engaged arrangement, and the adjustment recliner is configured to move selectively the seat back about the seat-back pivot axis relative to the seat bottom in response to an input when the lock recliner is in the disengaged arrangement.

2. The occupant support of claim 1, wherein the lock recliner includes a fixed flange that is blocked from rotating about the seat-back pivot axis relative to the seat bottom, a mobile flange that is configured to rotate relative to the fixed flange when the lock recliner is in the disengaged arrangement, and a recliner control unit that is configured to engage the mobile flange to block rotation of the mobile flange relative to the fixed flange when the lock recliner is in the engaged arrangement and to disengage the mobile flange to allow rotation of the mobile flange relative to the fixed flange when the lock recliner is in the disengaged arrangement.

3. The occupant support of claim 2, wherein the recliner control unit includes a uniform cam-shaft unit that is configured to move axially along the seat-back pivot axis and a plurality of pawls that are arranged circumferentially about the uniform cam-shaft unit and configured to move radially outwardly and inwardly relative to the seat-back pivot axis in response to axial movement of the uniform cam-shaft unit to move the lock recliner between the disengaged arrangement and the engaged arrangement respectively.

4. The occupant support of claim 3, wherein the uniform cam-shaft unit includes a central hub and a cam that is circular and uniform and the cam is aligned axially with the plurality of pawls and pushes the pluralities of pawls radially outward toward the mobile flange when the lock recliner is in the engaged arrangement.

5. The occupant support of claim 1, wherein the adjustment recliner is movable between the engaged arrangement and the disengaged arrangement, the adjustment recliner resists movement of the seat back relative to the seat bottom in the engaged arrangement, the adjustment recliner is configured to move the seat back relative to the seat bottom in one of a fine-adjustment mode and a gross-movement mode when the adjustment recliner is in the disengaged arrangement and the lock recliner is in the disengaged arrangement.

6. The occupant support of claim 5, wherein the adjustment recliner includes a fixed flange that is blocked from rotating about the seat-back pivot axis relative to the seat bottom, a mobile flange that is configured to be rotated by the recliner control unit relative to the fixed flange when the lock recliner is in the disengaged arrangement and the adjustment recliner is in the disengaged arrangement, and a recliner control unit that is configured to control rotation of the mobile flange.

7. The occupant support of claim 6, wherein the seat-motion controller includes a motor connected to the recliner control unit included in the adjustment recliner and the motor is configured to drive the recliner control unit included in the adjustment recliner to rotate the mobile flange included in the adjustment recliner at a first speed relative to the fixed flange included in the adjustment recliner when the lock recliner is in the disengaged arrangement and the adjustment recliner is in the engaged arrangement and operated in the fine-adjustment mode.

8. The occupant support of claim 7, wherein the mobile flange included in the adjustment recliner is free to rotate relative to the fixed flange in the adjustment recliner when the lock recliner is in the disengaged arrangement, the adjustment recliner is in the disengaged arrangement so that the adjustment recliner is operable in the gross-movement mode.

9. The occupant support of claim 7, wherein the motor is configured to drive the recliner control unit included in the adjustment recliner to rotate the mobile flange included in the adjustment recliner at a second speed relative to the fixed flange included in the adjustment recliner when the lock recliner is in the disengaged arrangement and the adjustment recliner is in the disengaged arrangement and operated in the gross-movement mode.

10. The occupant support of claim 6, wherein the recliner control unit includes an eccentric cam-shaft unit that is configured to move axially along the seat-back pivot axis and a plurality of pawls that are arranged circumferentially about the eccentric cam-shaft unit and move radially outwardly and inwardly relative to the seat-back pivot axis in response to rotation of the eccentric cam-shaft unit.

11. The occupant support of claim 10, wherein the lock recliner includes a fixed flange that is blocked from rotating about the seat-back pivot axis relative to the seat bottom, a mobile flange that is configured to rotate relative to the fixed flange when the lock recliner is in the disengaged arrangement, and a recliner control unit that is configured to engage the mobile flange to block rotation of the mobile flange relative to the fixed flange when the lock recliner is in the engaged arrangement and to disengage the mobile flange to allow rotation of the mobile flange included in the lock recliner relative to the fixed flange included in the lock recliner when the lock recliner is in the engaged arrangement.

12. The occupant support of claim 11, wherein the recliner control unit of the lock recliner includes a uniform cam-shaft unit that is configured to move axially along the seat-back pivot axis and a plurality of pawls that are arranged circumferentially about the uniform cam-shaft unit and configured to move radially outwardly and inwardly relative to the seat-back pivot axis in response to axial movement of the uniform cam-shaft unit to move the lock recliner between the disengaged arrangement and the engaged arrangement respectively, the uniform cam-shaft unit includes a central hub and a cam that is circular and uniform, and the cam is aligned axially with the plurality of pawls included in the recliner control unit of the lock recliner and pushes the pluralities of pawls radially outward toward the mobile flange included in the lock recliner when the lock recliner is in the engaged arrangement.

13. The occupant support of claim 1, wherein the seat-motion controller is configured to store information indicative of a set memory position of the seat back relative to the seat bottom and to activate to move the seat back to the set memory position in response to receiving a second input.

14. A method comprising:
providing an occupant support that includes a seat bottom, a seat back, and a seat-motion controller, the seat-motion controller including a lock recliner and a separate adjustment recliner spaced apart laterally from the lock recliner,
moving the lock recliner from an engaged arrangement to a disengaged arrangement in response to a fine-adjustment input,
powering the adjustment recliner with a motor to rotate the seat back in a first direction and a first speed relative to the seat bottom in response to the fine-adjustment input, and moving the lock recliner from the disengaged arrangement to the engaged arrangement in response to the fine-adjustment input ending.

15. The method of claim 14, further comprising moving the lock recliner from the engaged arrangement to the disengaged arrangement in response to a gross-movement input, moving the adjustment recliner from an engaged arrangement to a disengaged arrangement in response to the gross-movement input, and rotating the seat back at a second speed different than the first speed relative to the seat bottom.

16. The method of claim 15, further comprising moving the lock recliner from the disengaged arrangement to the engaged arrangement and moving the adjustment recliner from the disengaged arrangement to the engaged arrangement after rotating the seat back at the second speed.

17. The method of claim 15, wherein the motor is configured to power the adjustment, recliner to rotate the seat back at the second speed.

18. The method of claim 14, wherein the lock recliner includes a fixed flange, a mobile flange that is configured to rotate relative to the fixed flange when the lock recliner is in the disengaged arrangement, and a recliner control unit that includes a uniform cam-shaft unit and a plurality of pawls that are arranged circumferentially about the uniform cam-shaft unit and configured to move radially outwardly and inwardly relative to the uniform cam-shaft unit in response to axial movement of the uniform cam-shaft unit to move the lock recliner between the disengaged arrangement and the engaged arrangement respectively.

19. The method of claim 18, wherein the adjustment recliner includes a fixed flange, a mobile flange that is configured to be rotated by the recliner control unit relative to the fixed flange when the lock recliner is in the disengaged arrangement and the adjustment recliner is in the disengaged arrangement, and a recliner control unit that includes an eccentric cam-shaft unit and a plurality of pawls that are arranged circumferentially about the eccentric cam-shaft unit and configured to move radially outwardly and inwardly relative to the eccentric cam-shaft unit in response to rotation of the eccentric cam-shaft unit.

20. The method of claim 14, further comprising powering the adjustment recliner with the motor to rotate the seat back in a second direction opposite the first direction relative to the seat bottom in response to the fine-adjustment input ending after the lock recliner is moved from the disengaged arrangement to the engaged arrangement.

* * * * *